June 22, 1965      K. M. PETERSEN      3,190,508
METERING VALVE FOR FLUIDS UNDER PRESSURE
Filed March 5, 1963      4 Sheets-Sheet 1

INVENTOR.
KENNETH M. PETERSEN
BY *William T. Wise*
HIS AGENT

INVENTOR.
KENNETH M. PETERSEN
BY William T. Wise
HIS AGENT

June 22, 1965 K. M. PETERSEN 3,190,508
METERING VALVE FOR FLUIDS UNDER PRESSURE
Filed March 5, 1963 4 Sheets-Sheet 3

INVENTOR.
KENNETH M. PETERSEN
BY William T. Wise
HIS AGENT

June 22, 1965 K. M. PETERSEN 3,190,508
METERING VALVE FOR FLUIDS UNDER PRESSURE
Filed March 5, 1963 4 Sheets-Sheet 4

INVENTOR.
KENNETH M. PETERSEN
BY William T. Wise
HIS AGENT

United States Patent Office 3,190,508
Patented June 22, 1965

3,190,508
METERING VALVE FOR FLUIDS UNDER
PRESSURE
Kenneth M. Petersen, Canoga Park, Calif., assignor, by mesne assignments, to Rexall Drug and Chemical Company, Los Angeles, Calif., a corporation of Delaware
Filed Mar. 5, 1963, Ser. No. 262,937
15 Claims. (Cl. 222—394)

This invention relates to devices known in the art of fluid dispensing as metering valves.

More particularly this invention relates to a new and improved metering valve which is adapted upon actuation to dispense from a container of fluid under pressure a predetermined quantity of the pressurized fluid. The metering valve, in which the concept of the present invention resides, is especially suited to dispense those materials which are conventionally dispensed in precise quantities, such as, for example, perfumes and pharmaceuticals.

It is the object of this invention to provide a metering valve of simplified construction with a minimum of parts and adapted for easy and rapid assembly.

A further object of this invention is to provide an aerosol metering valve which has no springs and wherein the pressure within the container is utilized to return the valve, after discharge, to a sealing position.

A still further object of this invention is to provide a metering valve of simplified construction capable of delivering measured quantities of pressurized materials with a high degree of precision.

The foregoing and other objects as well as the advantages of the invention will become apparent to one skilled in the art of fluid dispensing by reference to the following detailed description which, taken in conjunction with the drawings, presents for purposes only of illustration several embodiments of the invention.

In the drawings.

Like reference numbers indicate like parts throughout the several views of the various embodiments of metering valves of this invention.

Figure 1:
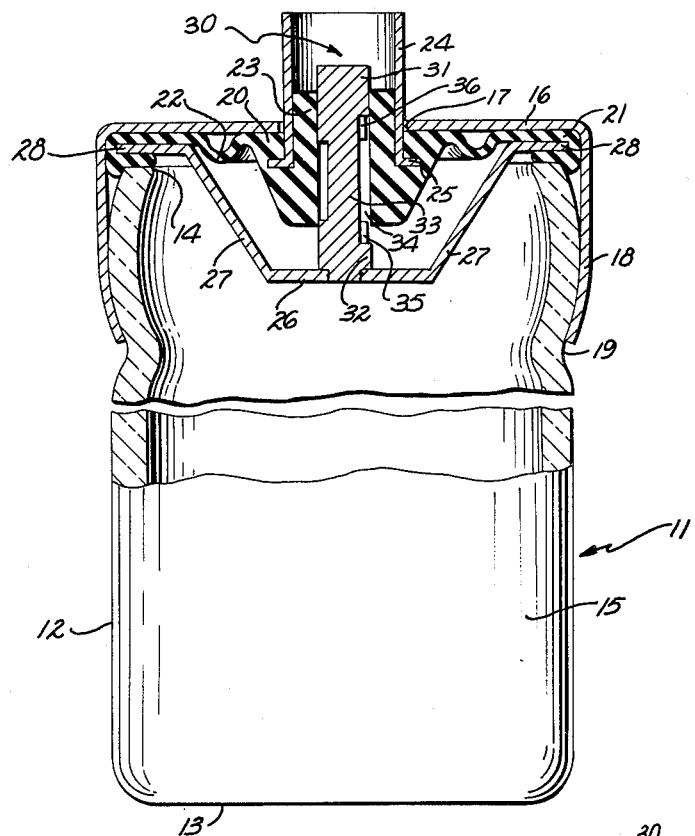
FIG. 1 is a fragmentary view, partially in cross-section, of one embodiment of the invention showing a valve in pre-discharge position.
Figure 2:
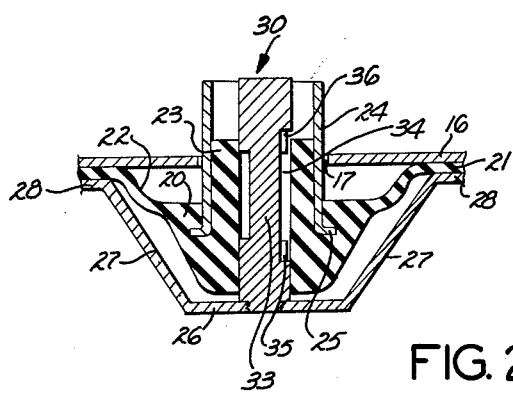
FIG. 2 is a fragmentary cross-sectional view of the embodiment of the invention shown in FIG. 1 showing the valve in a dispensing position.
Figure 3:
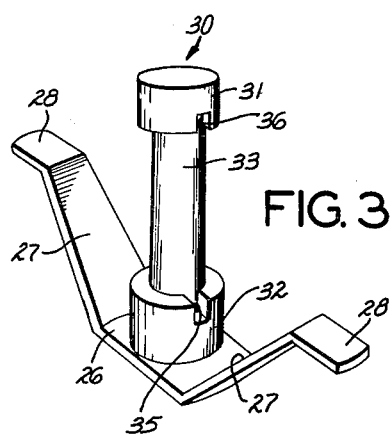
FIG. 3 is a view in perspective of the valve core and mounting means of the valve illustrated in FIGS. 1 and 2.

Referring now to the drawings, and particularly FIGS. 1, 2 and 3, a container 11 is formed with walls 12, a bottom 13 and an open mouth 14. The container may be constructed of any conventional material normally utilized in the art of pressurized compositions for aerosol application with containers of glass, stainless steel and aluminum being normally employed. The composition to be dispensed from the container 11 is held in the main body portion 15 of the container and may be any of the various classes of compositions which are normally dispensed in aerosol form, for example, perfumes, medicinal products, and the like.

The valve assembly includes a circular housing 16 having a central aperture 17 and is fastened over the open mouth 14 of the container by means of a depending flange 18 which is crimped into an annular groove 19 in the upper portion of the container wall 12. It is understood that this method of affixing the housing to the container is merely illustrative and any of the conventional techniques of fastening valves to pressurized containers as are in common use in the art may be employed. Beneath the housing 16, there is provided a flexible diaphragm 20 constructed of rubber, plastic or other typical resilient flexible material. The diaphragm 20 is sealed at its periphery 21 beneath the housing 16 to the upper portion of the container. The diaphragm includes a depending annular loop 22 to impart lateral resilience to the diaphragm as will be described more fully hereinafter. An annular sleeve 23 extends into the central aperture of the housing 16 and is bounded by a reciprocable rigid sleeve 24 which is affixed to the diaphragm by an outwardly flared portion 25. The rigid sleeve 24 is thereby sealed to the diaphragm such that vertical movement of the rigid sleeve causes a corresponding vertical movement of the diaphragm.

A valve core 30 is supported rigidly with respect to the container by a horizontal member 26 supported by vertically inclined members 27 and horizontal tabs 28 which are sealed beneath the outer periphery 21 of the diaphragm to the open mouth of the container. The valve core is provided with upper and lower collars 31, 32 which have the same outside diameter as the inside diameter of the annular sleeve 23 and which form seals therewith. The valve core 30 is provided with a central portion 33 between the two collars having a diameter less than the inside diameter of the annular sleeve and serves to form in cooperation with the annular sleeve and the upper and lower collars a metering chamber 34. The lower collar 32 has formed in its upper periphery a notch 35 and the upper collar has formed in its lower periphery a notch 36. These notches serve to form an inlet port to and an outlet port from the metering chamber 34.

In use, the container is inverted such that the contents contained in the main body portion 15 thereof communicate with the inlet notch 35 in the lower collar. In the position of the valve shown in FIG. 1, the metering chamber 34 will become full of fluid. For actuation of the metering valve, pressure is applied to the rigid sleeve 24 thereby forcing the rigid sleeve and diaphragm into the container as a unit, the annular sleeve sliding over the collars 31, 32 of the rigid valve core 30. During this operation, the lower portion of the annular sleeve will close the notch 34 and thereafter, upon further depression of the sleeve 24, the valve will reach a position as illustrated in FIG. 2 whereupon the fluid contained in the metering chamber 34 will pass through the notch 36 and be discharged to the atmosphere. When inward pressure upon the rigid sleeve 24 is released, the resilience of the diaphragm in combination with the vapor pressure of the fluid in the container will cause the rigid sleeve and diaphragm to return as a unit to the position illustrated in FIG. 1 and the valve is in condition for a further dispensing operation.

The presence of the depending annular loop 22 in the diaphragm is desirable to ensure that the diaphragm has sufficient lateral resilience that the annular sleeve will maintain sealing contact with the lower collar 32 during depression of the rigid sleeve 24. Where the material used to form the diaphragm has good resilient properties, the annular loop 22 may be omitted.

Figure 4:
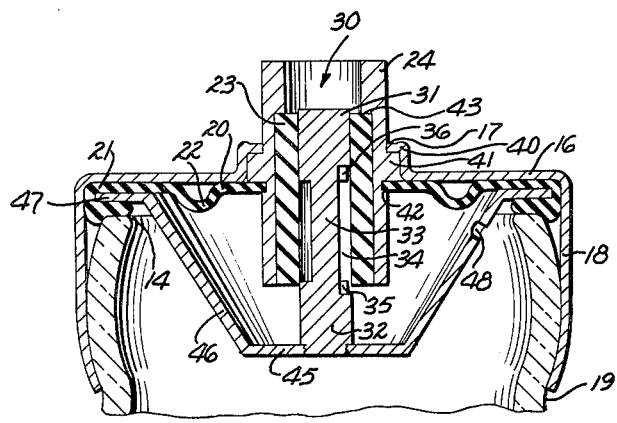
FIG. 4 is a fragmentary cross-sectional view of a different embodiment of the invention.

The embodiment illustrated in FIG. 4 employs a modified version of the flexible diaphragm and annular and rigid sleeves. The central portion of the valve housing 16 has an upwardly extending collar 40 which engages an annular ring 41 on the rigid sleeve 24. The collar 40 in conjunction with the ring 41 serves as a stop to limit upward travel of the rigid sleeve 24. The flexible diaphragm 20 extends into an annular slot 42 in the rigid sleeve 24 and is sealed therein. The annular sleeve 23 is a separate unit and is sealed within the inner periphery of the rigid sleeve 24. The annular sleeve is engaged around its upper surface by a shoulder 43 formed in the inner wall of the rigid sleeve. The application of pressure to the rigid sleeve 24 causes the flexible diaphragm 20 and the annular sleeve 23 to move with the rigid sleeve inwardly with respect to the container to ensure operation of the metering valve in a manner comparable to that described above in the discussion of FIGS. 1, 2 and 3.

The embodiment illustrated in FIG. 4 also illustrates an alternate means of mounting the valve core 30 rigidly with respect to the container. In this embodiment, which is illustrated in detail in FIG. 5, the valve core is supported by a cup-shaped member 44 comprising a base 45 to which the lower collar 32 of the valve core is affixed, a sidewall 36 and a horizontal upper surface 47 which is sealed beneath the outer periphery 21 of flexible diaphragm to the open mouth of the container. An aperture 48 is provided in the wall 46 of the cup-shaped member 44 to provide a passageway for fluid from the main body portion of the container to communicate with the metering chamber. When the container is placed in an upright position after actuation of the valve, it is apparent that the cup-shaped member will contain a substantial volume of fluid up to the level of the aperture 48. This will ensure that the annular sleeve 23 will remain partially wetted with fluid when the valve is not in use, thus serving to minimize dimensional changes due to alternate wetting and drying.

Figure 6:
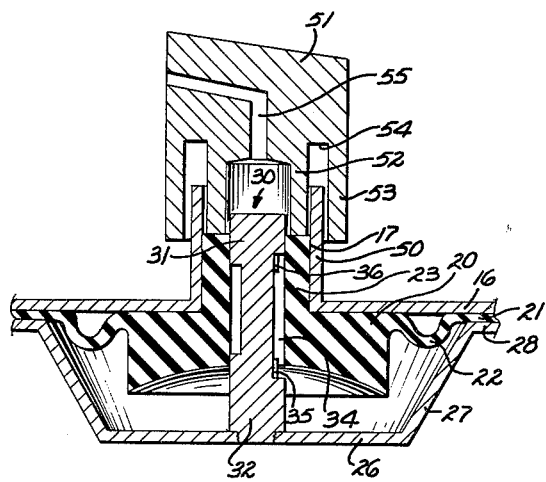
FIG. 6 is a fragmentary cross-sectional view of a further embodiment of the invention.

Referring now to FIG. 6 which illustrates a further embodiment of the metering valve of the present invention, the valve housing 16 is formed with an upwardly extending central portion 50 which bounds the central aperture 17 into which extends the annular sleeve 23 of the diaphragm 20. An actuator button 51 is provided comprising an inner annular member 52 which engages the upper portion of the annular sleeve 23, an outer annular member 53 and an annular groove 54 into which extends, in slidable relationship, the upper portion of the member 50. The actuator button 51 has a channel 55 to provide a passageway for fluid dispensed from the metering valve to the atmosphere. In operation, pressure upon the actuator button 51 causes pressure to be uniformly exerted around the circumference of the annular sleeve 23, thereby moving the annular sleeve in sliding contact with the valve core 30 to close the notch 35 and thereafter open the notch 36 to cause a metered quantity of fluid to pass from the metering chamber 34 through the passageway 55 to the atmosphere.

Figure 7:
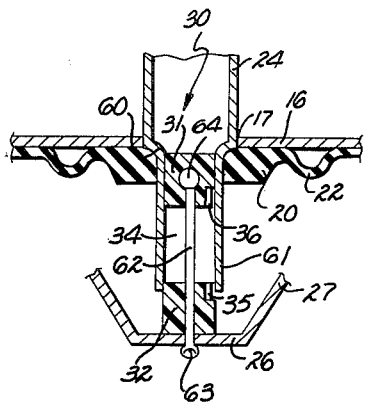
FIG. 7 is a fragmentary cross-sectional view of a still further embodiment of the invention.

In the embodiment illustrated in FIGURE 7, the movable rigid sleeve 24 has an inturned shoulder 60, the undersurface of which engages the inner extension of the diaphragm 20, and a depending annular sleeve 61 having an outside diameter which is less than the inside diameter of the rigid sleeve 24. The upper and lower collars 31, 32 of the valve core 30 are formed of a resilient material adapted to form seals with the inner surface of the depending sleeve 61. The two collars are held in spaced relationship by a rigid member 62 which extends through the lower collar 32 and is fastened to the member 26 by fastening means 63. The rigid member 62 has a bulb-like upper tip 64 which is sealed within the upper collar 31 of the valve core. In operation, pressure applied to the rigid sleeve 24 causes the rigid sleeve and the depending sleeve 61 to move as a unit, the collar 60 bearing upon the flexible diaphragm and causing it to move therewith. The notch 35 is closed and, upon further inward movement of the rigid sleeve, the notch 36 communicates with the atmosphere thereby dispensing a metered quantity of fluid from the metering chamber 34.

Figure 8:
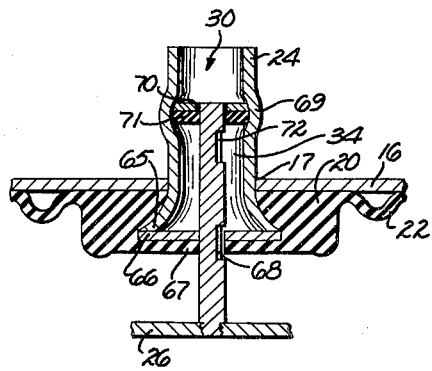
FIG. 8 is a fragmentary cross-sectional view of another embodiment of the invention.

In the embodiment illustrated in FIG. 8, the rigid sleeve 24 is sealed within the diaphragm 20 by means of an outwardly flared portion 65. Immediately beneath the outwardly flared portion of the rigid sleeve is a washer 66 which supports an inwardly extending flexible portion 67 of the diaphragm. A notch 68 is provided in valve core 30 to provide a passageway for fluid to enter the metering chamber 34 when the diaphragm is in its outermost position as illustrated. The rigid sleeve 24 has an outwardly bowed portion 69 within which is locked a rigid washer 70 and a resilient washer 71 through which the valve core extends. A notch 72 is provided in the upper portion of the valve core to provide a means for the passage of fluid from the metering chamber 34 to the atmosphere when the rigid sleeve is depressed. In operation, pressure upon the rigid sleeve causes the entire metering chamber, which is bounded by the inner surface of the rigid sleeve 24 and the washers 66 and 71, to move as a unit, thereby closing the notch 68 and opening the notch 72 to dispense a metered quantity of pressurized fluid from the metering chamber to the atmosphere.

Figure 9:
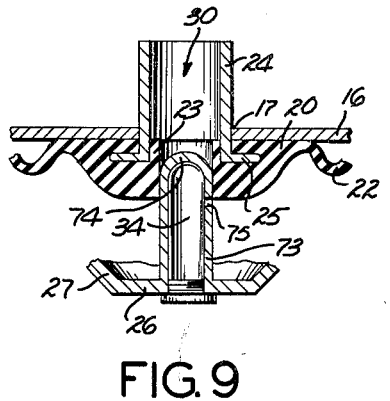
FIG. 9 is a fragmentary cross-sectional view of yet another embodiment of the invention.

In the embodiment illustrated in FIGURE 9, the valve core 30 is in the form of a hollow member 73 sealed at its lower end to the member 26 and having a closed upper end 74. The member 73 has a cylindrical wall having an outside diameter equal to the inside diameter of the annular sleeve 23 of the diaphragm 20 and forms the metering chamber 34. An aperture 75 is provided in the hollow member 73 which serves the dual function of providing an inlet for fluid to the metering chamber when the diaphragm is in its outermost position (as illustrated) and a means to dispense fluid to the atmosphere from the metering chamber when the diaphragm is depressed. In operation, pressure upon the rigid sleeve causes the diaphragm and annular sleeve to be depressed as a unit in slidable contact with the outer walls of the hollow member 73, initially closing the aperture 75 and then opening it into discharge position to dispense a metered quantity of fluid from the metering chamber.

Figure 5:
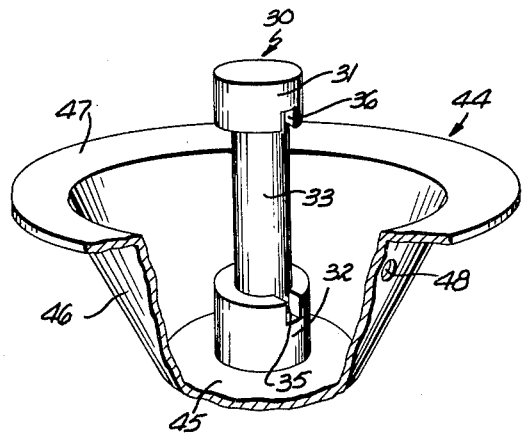
FIG. 5 is a view in perspective of a modified valve core and mounting means as used in the valve illustrated in FIG. 4.

It will be understood by one of normal skill in the art of fluid dispensing that the means illustrated particularly in FIGURES 3 and 5 for mounting the valve core 30 rigidly with respect to the container are merely illustrative and various modifications can be made therein without departing from the spirit of this invention.

The metering valve of the present invention, which has been described hereinabove in various illustrative embodiments, represents a significant improvement over metering valves heretofore known in that it has a relatively small number of operating parts thereby facilitating its assembly and, furthermore, does not depend for action on the presence of one or more springs. Such springs which have been generally used in many types of metering valves of the prior art are particularly difficult to handle during valve assembly. After actuation of the valve of this invention, the flexible diaphragm is returned to its original nondispensing position through the force exerted on the inner surface of the diaphragm by the vapor pressure of the fluid composition in the container. Such pressurized compositions as are normally dispensed by metering valves contain various low-boiling hydrocarbons and fluorohydrocarbons which impart to the composition a constant positive pressure as long as any composition remains in the container.

Throughout the foregoing description, and in the claims appended hereto, where parts are described using such terms of direction as "upper" and "lower," reference is made to the relative position of such parts as illustrated in the drawings, that is, with the container 11 in its normal upright position. During the dispensing operation, the container will be inverted in order to provide a supply of fluid contents adjacent to the inlet means communicating with the metering chamber.

The various terms employed in the foregoing specification and in the claims appended hereto are intended as terms of description and not of limitation, and included within their scope are any and all equivalents of the features shown and described herein, or portions thereof, and all such equivalents are included within the scope of the claims.

The subject matter which the applicant regards as his invention is particularly pointed out and distinctly claimed as follows:

I claim:

1. Valve means for effectuating the delivery of a metered quantity of fluid under pressure from a container comprising an outer valve housing having a central aperture, a flexible diaphragm of resilient material beneath said housing, the periphery of said diaphragm being sealed beneath said housing to the upper portion of the container, a reciprocable sleeve within said central aperture cooperating with said diaphragm, a valve core extending upwardly into said sleeve from the lower end thereof in slidable sealing relationship therewith, means to mount said valve core rigidly with respect to the container, said sleeve and said core cooperating to form a metering chamber, inlet valve means thereto and outlet valve means therefrom, said inlet valve means being open and said outlet valve means being closed when said sleeve is in its outermost position, and means to urge said diaphragm and said sleeve as a unit into the container thereby closing said inlet valve means and opening said outlet valve means to dispense a metered quantity of fluid under pressure from the metering chamber.

2. Valve means according to claim 1 wherein the lower end of said valve core is affixed to a member rigidly mounted with respect to the container by a plurality of elements sealed to the upper portion of the container beneath the periphery of said diaphragm.

3. Valve means according to claim 1 wherein said means to mount said valve core comprises a rigid dishlike retaining cup the periphery of which is sealed beneath the outer periphery of said diaphragm to the upper portion of the container, said valve core projecting upwardly from the center of said cup, and means in the wall of said cup to provide a passageway for fluid from the main body portion of the container into communication with said inlet valve means.

4. Valve means according to claim 1 wherein said diaphragm is formed with an annular depending loop to impart a lateral resilience to said diaphragm.

5. Valve means for effectuating the delivery of a metered quantity of fluid under pressure from a container comprising an outer valve housing having a central aperture, a reciprocable flexible diaphragm of resilient material beneath said housing, the periphery of said diaphragm being sealed beneath said housing to the upper portion of the container, said diaphragm having a central portion in the form of an annular sleeve extending into said central aperture, a valve core extending into said annular sleeve, means to mount said valve core rigidly with respect to the container, said valve core comprising upper and lower collars having diameters equal to the inside diameter of said sleeve and a central portion between said collars having a diameter less than the inside diameter of said sleeve to form in cooperation with the annular sleeve a metering chamber, fluid inlet means to permit the passage of fluid from the main body portion of the container to the metering chamber when the diaphragm is in its outermost position, fluid discharge means to permit the passage of fluid from said metering chamber to the atmosphere when the diaphragm is in its innermost position and means to urge said diaphragm into the container thereby causing said annular sleeve to move in sliding contact with the upper and lower collars to close said fluid inlet means and open said fluid discharge means to dispense a metered quantity of fluid under pressure from the metering chamber.

6. Valve means for effectuating the delivery of a metered quantity of fluid under pressure from a container comprising an outer valve housing having a central aperture, a rigid sleeve constituting a discharge conduit from said valve means reciprocable within said central aperture, a flexible diaphragm of resilient material beneath said housing having a central portion in the form of an annular sleeve extending into said rigid sleeve and sealed thereto such that reciprocation of the rigid sleeve causes said diaphragm to reciprocate therewith, a rigid member centered beneath said annular sleeve and supported in fixed relationship with respect to the container by a plurality of elements sealed beneath the periphery of said diaphragm to the upper portion of the container, a valve core mounted to said rigid member and projecting into said annular sleeve, said valve core comprising upper and lower collars having diameters equal to the inside diameter of said annular sleeve and a central portion between said collars having a diameter less than the inside diameter of said annular sleeve to form in cooperation with the annular sleeve a metering chamber, a notch in the upper periphery of the lower collar to permit the passage of fluid from the main body portion of the container to the metering chamber when the diaphragm is in its outermost position, a notch in the lower periphery of the upper collar to permit the passage of fluid from the metering chamber to the discharge conduit when the diaphragm is in its innermost position, reciprocation of the rigid sleeve into the container causing the annular sleeve to move in sliding contact with the upper and lower collars to close the notch in the lower collar and open the notch in the upper collar whereby a metered quantity of fluid under pressure is dispensed from the metering chamber.

7. Valve means for effectuating the delivery of a metered quantity of fluid under pressure from a container comprising an outer valve housing having a central aperture, a flexible diaphragm of resilient material beneath said housing, the periphery of said diaphragm being sealed beneath the housing to the upper portion of the container, a rigid sleeve constituting a discharge conduit from said valve means reciprocable within the central aperture and sealed to said diaphragm, an annular sleeve of resilient material sealed within said rigid sleeve and reciprocable therewith, a valve core extending into said annular sleeve, means to mount said valve core rigidly with respect to the container, said valve core comprising upper and lower collars having diameters equal to the inside diameter of said annular sleeve and a central portion between said collars having a diameter of less than the inside diameter of said annular sleeve to form in cooperation with the annular sleeve a metering chamber, a notch in the upper periphery of the lower collar to permit the passage of fluid from the main body portion of the container to the metering chamber when the diaphragm is in its outermost position, a notch in the lower periphery of the upper collar to permit the passage of fluid from the metering chamber to the discharge conduit when the diaphragm is in its innermost position, reciprocation of the rigid sleeve into the container causing the annular sleeve to move in sliding contact with the upper and lower collars to close the notch in the lower collar and open the notch in the upper collar whereby a metered quantity of fluid under pressure is dispensed from the metering chamber.

8. Valve means for effectuating the delivery of a metered quantity of fluid under pressure from a container comprising an outer valve housing having a central aperture, a rigid sleeve constituting a discharge conduit from said valve means reciprocable within said central aperture, a flexible diaphragm the outer periphery of which is sealed beneath the valve housing to the upper portion of the container, said flexible diaphragm extending into a circumferential groove in the rigid sleeve and sealed therein, an annular sleeve of resilient material sealed within said rigid sleeve and movable therewith, a valve core extending into said annular sleeve, means to rigidly mount said valve core with respect to the container, said valve core comprising upper and lower collars having diameters equal to the inside diameter of said sleeve and a central portion between said collars having a diameter less than the inside diameter of said sleeve to form in cooperation with the annular sleeve a metering chamber, fluid inlet means to permit the passage of fluid from the main body portion of the container to the metering chamber when the diaphragm is in its outermost position, fluid discharge means to permit the passage of fluid from said metering chamber to the atmosphere when the diaphragm is in its innermost position and means to urge said diaphragm into the container thereby causing said annular sleeve to move in sliding contact with the upper and lower collars to close said fluid inlet means and open said fluid discharge means to dispense a metered quantity of fluid under pressure from the metering chamber.

9. Valve means for effectuating the delivery of a metered quantity of fluid under pressure from a container comprising an outer valve housing having a central aperture, a rigid sleeve constituting a discharge conduit from said valve means reciprocable within said central aperture, a flexible diaphragm of resilient material beneath said housing having a central portion in the form of an annular sleeve extending into said rigid sleeve and sealed thereto such that reciprocation of the rigid sleeve causes said diaphragm to reciprocate therewith, the periphery of said diaphragm being sealed beneath the housing to the upper portion of the container, a hollow member closed at both ends and having a cylindrical wall within an outside diameter equal to the inside diameter of said annular sleeve extending into said annular sleeve, means to mount said hollow member rigidly with respect to the container, an opening in the wall of said hollow member beneath the lowermost projection of said annular sleeve when the diaphragm is in its outermost position to permit the passage of fluid from the main body portion of the container into said hollow member, reciprocation of the rigid sleeve into the container causing the annular sleeve to move in sliding contact with the hollow member a distance sufficient to cause said opening in the hollow member to communicate with the discharge conduit thereby to dispense a measured quantity of fluid under pressure from the hollow member.

10. Valve means for effectuating the delivery of a metered quantity of fluid under pressure from a container comprising an outer valve housing having a central aperture, a rigid member reciprocable within said central aperture comprising an upwardly extending annular sleeve constituting a discharge conduit from the valve means and a downwardly extending annular sleeve having a diameter less than the diameter of said discharge conduit, a flexible diaphragm having a central opening to receive the downwardly extending annular sleeve in sealing relationship therewith, the periphery of said diaphragm being sealed beneath the housing to the upper portion of the container, collars of flexible material within the upper and lower portions of said downwardly extending sleeve in slidable sealing contact therewith, means to mount said collars in spaced relationship rigidly with respect to the container, said collars and said sleeve cooperating to form a metering chamber, fluid inlet means to permit the passage of fluid from the main body portion of the container to the metering chamber when the diaphragm is in its outermost position, fluid discharge means to permit the passage of fluid from said metering chamber to the atmosphere when the diaphragm is in its innermost position and means to urge said diaphragm into the container thereby causing said downwardly extending sleeve to move in sliding contact with the upper and lower collars to close said fluid inlet means and open said fluid discharge means to dispense a metered quantity of fluid under pressure from the metering chamber.

11. Valve means according to claim 10 wherein said fluid inlet means comprises a notch in the upper periphery of said lower collar and said fluid discharge means comprises a notch in the lower periphery of said upper collar.

12. Valve means according to claim 10 wherein said collars are held in spaced relationship within said downwardly extending sleeve by a rigid member having an outside diameter less than the inside diameter of said downwardly extending sleeve.

13. Valve means for effectuating the delivery of a metered quantity of fluid under pressure from a container comprising an outer valve housing having an upwardly extending tubular member defining a discharge conduit from the valve means, a flexible diaphragm of resilient material beneath said housing having a central portion in the form of an annular sleeve extending into said tubular member in slidable sealing relationship therewith, the periphery of said diaphragm being sealed beneath said housing to the upper portion of the container, a valve core extending into said annular sleeve, means to mount said valve core rigidly with respect to the container, said valve core comprising upper and lower collars having diameters equal to the inside diameter of said sleeve and a central portion between said collars having a diameter less than the inside diameter of said sleeve to form in cooperation with the annular sleeve a metering chamber, fluid inlet means to permit the passage of fluid from the main body portion of the container to the metering chamber when the diaphragm is in its outermost position, fluid discharge means to permit the passage of fluid from said metering chamber into said tubular member when the diaphragm is in its innermost position, an actuator button comprising an annular member slidable within the tubular member and bearing uniformly upon the upper surface of said annular sleeve, and a passageway communicating with the atmosphere, the application of pressure upon said actuator button causing said annular sleeve to move in sliding contact with the upper and lower collars to close said fluid inlet means and open said fluid discharge means to dispense a metered quantity of fluid from the metering chamber through said passageway to the atmosphere.

14. Valve means according to claim 13 wherein said fluid inlet means comprises a notch in the upper periphery of said lower collar and said fluid discharge means comprises a notch in the lower periphery of said upper collar.

15. Valve means for effectuating the delivery of a metered quantity of fluid under pressure from a container comprising an outer valve housing having central aperture, a flexible diaphragm of resilient material beneath said housing, the periphery of said diaphragm being sealed beneath said housing to the upper portion of the container, said diaphragm having a circular opening in its lower end centered beneath said central aperture, a rigid sleeve slidable within said central aperture and sealed to said diaphragm such that reciprocation of said sleeve causes said diaphragm to reciprocate therewith, a resilient sealing washer locked within said rigid sleeve and having a circular opening in register with the circular opening in the lower end of said diaphragm, the inner walls of the rigid sleeve beneath the sealing washer defining a metering chamber, a cylindrical member rigidly mounted with respect to the container and extending into the circular openings in the lower end of said diaphragm and in said washer in slidable sealing relationship therewith, a lower notch in said cylindrical member to permit fluid to enter the metering chamber from the main body portion of the container when the diaphragm is in its uppermost position and an upper notch in said cylindrical member to permit fluid to be discharged from the metering chamber to the atmosphere when the diaphragm is in its innermost position, reciprocation of said rigid sleeve into the container causing said washer and the lower end of said diaphragm to move in sliding contact with said cylindrical member to close the lower notch and open the upper notch to dispense a metered quantity of fluid from the metering chamber.

References Cited by the Examiner
UNITED STATES PATENTS

| | | | |
|---|---|---|---|
| 2,711,271 | 6/55 | Schlicksupp | 222—415 X |
| 2,744,665 | 5/56 | Carlson et al. | 251—353 |
| 2,883,090 | 4/59 | Remane. | |
| 3,117,700 | 1/64 | Gorman | 239—350 X |

RAPHAEL M. LUPO, *Primary Examiner.*